United States Patent [19]
Gulick et al.

[11] Patent Number: 5,812,800
[45] Date of Patent: Sep. 22, 1998

[54] COMPUTER SYSTEM WHICH INCLUDES A LOCAL EXPANSION BUS AND A DEDICATED REAL-TIME BUS AND INCLUDING A MULTIMEDIA MEMORY FOR INCREASED MULTI-MEDIA PERFORMANCE

[75] Inventors: Dale E. Gulick; Andy Lambrecht; Mike Webb; Larry Hewitt, all of Austin; Brian Barnes, Round Rock, all of Tex.

[73] Assignee: Advanced Micro Devices, Inc., Sunnyvale, Calif.

[21] Appl. No.: 526,595

[22] Filed: Sep. 11, 1995

[51] Int. Cl.$^6$ ..................................... H01J 13/00
[52] U.S. Cl. .................. 395/308; 395/306; 395/309; 395/281; 395/822; 395/842; 395/847; 395/856; 395/857
[58] Field of Search ..................... 395/306, 308, 395/309, 154, 155, 842, 846, 847, 848, 307, 281, 476, 458, 856, 857, 858, 840, 841

[56] References Cited

U.S. PATENT DOCUMENTS

| | | | |
|---|---|---|---|
| 5,245,322 | 9/1993 | Dinwiddie, Jr. et al. . | |
| 5,359,715 | 10/1994 | Heil et al. ................................. | 395/308 |
| 5,450,551 | 9/1995 | Amini et al. ............................. | 395/308 |
| 5,497,373 | 3/1996 | Hulen et al. . | |
| 5,519,839 | 5/1996 | Culley et al. ............................ | 395/310 |
| 5,535,414 | 7/1996 | Burge ....................................... | 395/827 |
| 5,546,546 | 8/1996 | Bell et al. ................................ | 395/292 |
| 5,546,547 | 8/1996 | Bowes et al. ............................ | 395/294 |
| 5,555,383 | 9/1996 | Elazar et al. ............................ | 395/306 |
| 5,557,757 | 9/1996 | Gephardt et al. ....................... | 395/306 |
| 5,560,022 | 9/1996 | Dunstan et al. ........................ | 395/750 |
| 5,561,820 | 10/1996 | Bland et al. ............................ | 395/847 |
| 5,564,001 | 10/1996 | Lewis ...................................... | 395/154 |
| 5,568,619 | 10/1996 | Blackledge et al. .................... | 395/306 |
| 5,594,873 | 1/1997 | Garrett ................................... | 395/281 |
| 5,621,902 | 4/1997 | Cases et al. ............................ | 395/309 |
| 5,625,845 | 4/1997 | Alltran et al. ......................... | 395/856 |
| 5,664,152 | 9/1997 | Ezzet ...................................... | 711/153 |
| 5,666,545 | 9/1997 | Marshall et al. ....................... | 395/304 |
| 5,689,660 | 11/1997 | Johnson et al. ........................ | 395/309 |
| 5,692,211 | 11/1997 | Gulick et al. .......................... | 395/800 |

OTHER PUBLICATIONS

PCI Local Bus—*PCI Multimedia Design Guide*—Revision 1.0—Mar. 29, 1994, 43 pages.

*Primary Examiner*—Ayaz R. Sheikh
*Assistant Examiner*—Raymond N. Phan
*Attorney, Agent, or Firm*—Conley, Rose & Tayon; Jeffrey C. Hood

[57] ABSTRACT

A computer system optimized for real-time applications which provides increased performance over current computer architectures. The system includes a standard local bus, such as the PCI bus, and also includes a dedicated real-time bus or multimedia bus. The PCI bus and the multimedia bus are comprised on the motherboard and include connector slots for receiving add-in cards. Multimedia device expansion cards each include two connectors which correspond to the PCI bus and the multimedia bus. Thus multimedia devices such as video cards, audio cards, etc., as well as communications devices, transfer real-time data through a separate bus without requiring arbitration for the PCI bus. The computer system of the present invention thus provides much greater performance for real-time applications than prior systems.

29 Claims, 8 Drawing Sheets

COMPUTER SYSTEM WHICH INCLUDES A LOCAL EXPANSION BUS AND A DEDICATED REAL-TIME BUS AND INCLUDING A MULTIMEDIA MEMORY FOR INCREASED MULTI-MEDIA PERFORMANCE

FIELD OF THE INVENTION

The present invention relates to a computer system which includes a local expansion bus such as the Peripheral Component Interconnect (PCI) bus and a separate real-time bus and which includes a multimedia memory for use by multimedia and communication devices coupled to the PCI bus, thereby increasing multimedia and real-time application performance.

DESCRIPTION OF THE RELATED ART

Computer architectures generally include a plurality of devices interconnected by one or more various buses. For example, modern computer systems typically include a CPU coupled through bridge logic to main memory. The bridge logic also typically couples to a high bandwidth local expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus. Examples of such expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modern multimedia applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications. Rather, multimedia hardware is typically designed as an add-in card for optional insertion in an expansion bus of the computer system, wherein the expansion bus is designed for non-realtime applications.

In many cases, multimedia hardware cards situated on an expansion bus do not have the required access to system memory and other system resources for proper operation. For example, a multimedia hardware card situated on the PCI expansion bus must first arbitrate for control of the PCI bus before the device can access system memory. In addition, since the computer system architecture is not optimized for multimedia, multimedia hardware cards generally do not make efficient use of system resources. As an example, multimedia hardware cards typically include their own memory in addition to system memory. For example, video accelerator cards are typically configured with one to four Megabytes of video RAM. Audio cards, video capture cards, and other multimedia cards are also generally configured with dedicated on-board memory. This requirement of additional memory adds undesirable cost to the system.

As multimedia applications become more prevalent, multimedia hardware will correspondingly become essential components in personal computer systems. Therefore, an improved computer system architecture is desired which is optimized for real-time multimedia and communications applications as well as for non-realtime applications. In addition, improved methods are desired for transferring real-time data to multimedia hardware.

Applicant is aware of two new graphics standards from the Video Electronics Standards Association (VESA) which are designed to improve digital video transfers in computer systems. These two standards are referred to as the VESA advanced feature connector (VAFC) and the VESA media channel (VMC). A third standard has been proposed by Intel and ATI referred to as the shared frame buffer interconnect (SFBI).

The VAFC standard is a 32 bit replacement for prior 8 bit VGA connectors which supports video at much higher resolutions and in better color. The VMC standard also offers a 32 data path and supports up to 15 video streams simultaneously. The VMC standard comprises a dedicated channel for real-time video, and peripherals can communicate independently without slowing the system CPU. The VMC standard also decouples the memory subsystem from the video transfer specification, allowing graphics board manufacturers to offer a variety of boards with differing types of graphics memory.

The SFBI standard combines frame buffers and memory use by each multimedia system into a single shared memory pool. The SFBI standard also includes a protocol for arbitrating among devices attempting to access the memory. However, one drawback to this standard is that the standard is designed to maintain all of the components on a single board. The SFBI standard does not provide an external feature connector unless SFBI cards are connected to another over the host bus. In addition, SFBI cards can include a VMC or VAFC connector for connecting to a VMC or VAFC card.

SUMMARY OF THE INVENTION

The present invention comprises a computer system and method optimized for real-time applications which provides increased performance over current computer architectures. The system includes a standard local bus, such as the PCI bus, and also includes a dedicated real-time bus or multimedia bus. The PCI bus and the multimedia bus are comprised on the motherboard and include connector slots for receiving add-in cards. Multimedia device expansion cards each include two connectors which correspond to the PCI bus and the multimedia bus. Thus multimedia devices such as video cards, audio cards, etc., as well as communications devices, transfer real-time data through a separate bus without requiring arbitration for the PCI bus. The computer system of the present invention thus provides much greater performance for real-time applications than prior systems.

The computer system comprises a motherboard including a CPU coupled through chip set or bridge logic to main memory. The bridge logic couples to a local bus such as the PCI bus. The motherboard comprises a plurality of PCI expansion bus connector slots connected to the PCI bus for receiving add-in devices. The motherboard also includes a real-time expansion bus comprising a plurality of connector slots. The real-time expansion bus connector slots correspond to respective ones of the PCI expansion bus connector slots.

The computer system further includes one or more modular add-in cards adapted for insertion into the PCI connector slots and the real-time expansion bus slots. Expansion cards or add-in cards each include a first edge connector for mechanically and electrically connecting to a PCI expansion bus slot, and a second edge connector for mechanically and electrically connecting to a corresponding real-time bus slot. Various devices may be connected to the PCI bus, including a video card, sound card, MPEG decoder card, etc.

In a preferred embodiment of the invention, the computer system includes a multimedia memory coupled to each of the PCI local expansion bus and the real-time bus. One or more multimedia devices may be coupled to the PCI local expansion bus and the real-time bus. Each of these devices accesses the multimedia memory to retrieve necessary code and data to perform respective operations. The multimedia devices preferably include an arbitration protocol for accessing the multimedia memory using the real-time bus.

Therefore, the present invention comprises a novel computer system architecture and method which standardizes a real-time bus with a local expansion bus to increase the performance of real-time peripherals and applications. The present invention also provides improved access for real-time devices to a shared local memory.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

INCORPORATION BY REFERENCE

PCI System Architecture by Tom Shanley and Don Anderson and available from Mindshare Press, 2202 Buttercup Dr., Richardson, TX 75082 (214) 231-2216, is hereby incorporated by reference in its entirety.

The Intel Peripherals Handbook, 1994 and 1995 editions, available from Intel Corporation, are hereby incorporated by reference in their entirety. Also, data sheets on the Intel 82430FX PCIset chipset, also referred to as the Triton chipset, are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

The Video Electronics Standards Association (VESA) VESA advanced feature connector (VAFC) specification and the VESA media channel (VMC) specification are hereby incorporated by reference in their entirety.

The Intel-ATI shared frame buffer interconnect (SFBI) specification is also hereby incorporated by reference in its entirety.

COMPUTER SYSTEM BLOCK DIAGRAM

Figure 1:
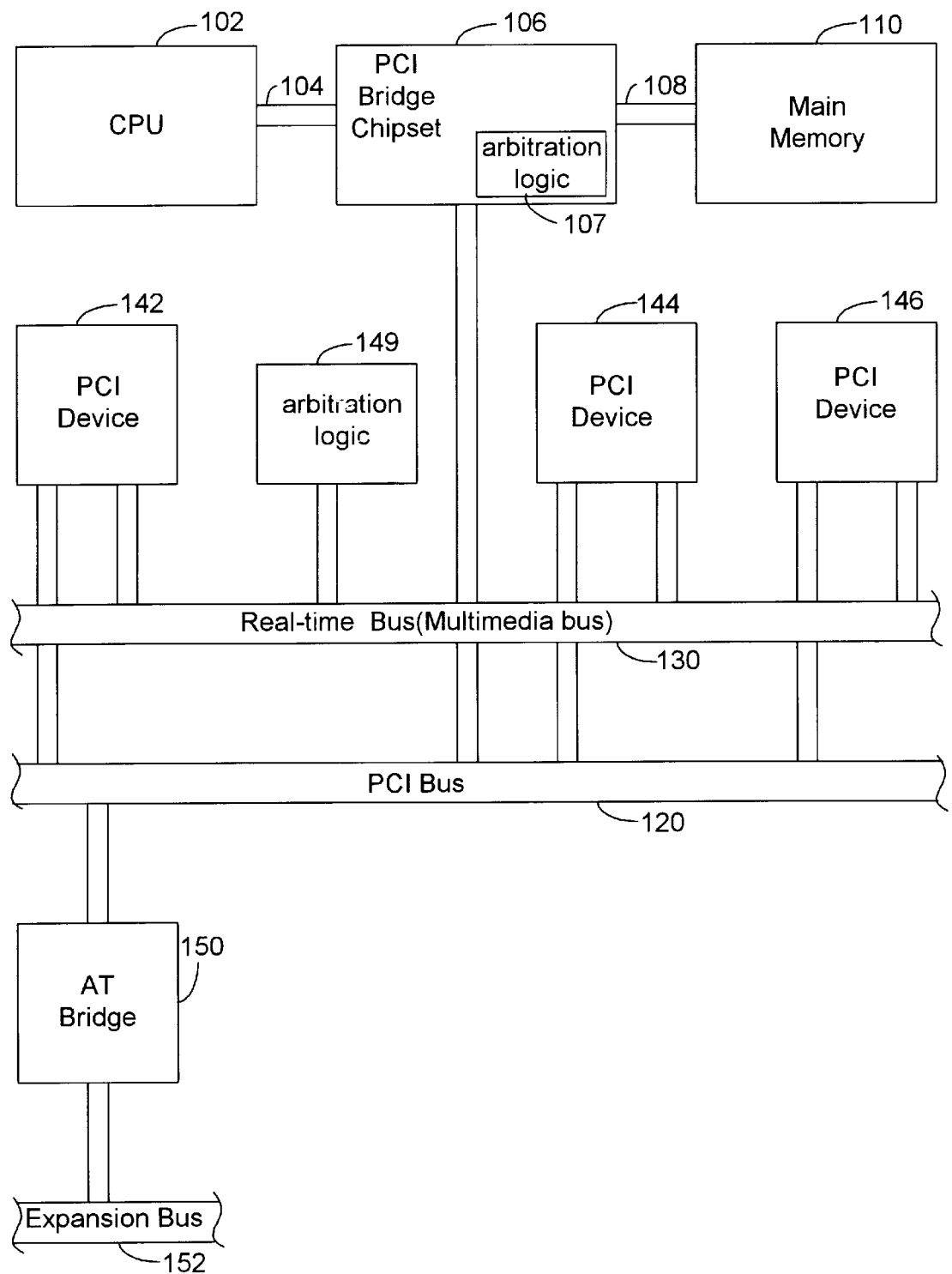
FIG. 1 is a block diagram of a computer system including a local expansion bus and a real-time bus according to the present invention.

Referring now to FIG. 1, a block diagram of a computer system according to the present invention is shown. As shown, the computer system includes a central processing unit (CPU) 102 which is coupled through a CPU local bus 104 to a host/PCI/cache bridge or chipset 106. The chipset 106 includes arbitration logic 107 according to the present invention. The chipset 106 is preferably similar to the Triton chipset available from Intel Corporation, including certain arbiter modifications to accommodate the real-time bus of the present invention. A second level or L2 cache memory (not shown) may be coupled to a cache controller in the chipset, as desired. The bridge or chipset 106 couples through a memory bus 108 to main memory 110. The main memory 110 is preferably DRAM (dynamic random access memory) or EDO (extended data out) memory, or other types of memory, as desired.

The chipset logic 106 preferably includes a memory controller for interfacing to the main memory 110 and also includes the arbitration logic 107. The chipset logic 106 preferably includes various peripherals, including an interrupt system, a real time clock (RTC) and timers, a direct memory access (DMA) system, and ROM/Flash memory (all not shown). Other peripherals (not shown) are preferably comprised in the chipset 106, including communications ports, diagnostics ports, command/status registers, and non-volatile static random access memory (NVSRAM).

The host/PCI/cache bridge or chipset 106 also interfaces to a local expansion bus 120. In the preferred embodiment, the local expansion bus 120 is the peripheral component interconnect (PCI) bus 120. However, it is noted that other local buses may be used, such as the VESA (Video Electronics Standards Association) VL bus. Various types of devices may be connected to the PCI bus 120.

The computer system shown in FIG. 1 also includes a real-time bus, also referred to as a multimedia bus 130. The real-time bus 130 preferably includes a 32 or 64 bit data path and may also include address and control portions. In the preferred embodiment, the real-time bus 130 includes only a 32 bit or 64 bit data path and does not include address or control portions. In one embodiment, devices use the PCI bus 120 for addressing and control and use the multimedia or real-time bus 130 for high speed data transfers.

One or more PCI devices 142, 144, and 146 are coupled to each of the PCI bus 120 and the real-time bus 130. The PCI devices 142–146 include standard PCI interface circuitry for communicating on the PCI bus 120. The PCI devices 142–146 also include interfaces to the real-time bus 130. The PCI devices 142–146 use the real-time bus 130 to communicate data between the respective devices. As described further below, one or more of the PCI devices 142–146 are comprised on modular expansion cards adapted for insertion into respective slots of each of the real-time bus 130 and PCI bus 120.

In one embodiment, arbitration logic 149 is coupled to the real-time bus 130 and performs arbitration for the devices 142–146 on the bus 130. In this embodiment, the PCI devices 142–146 provide request signals on the real-time bus 130, and the arbitration logic 149 grants bus access according to a desired arbitration method. Alternatively, the arbitration logic 149 is not included, and the PCI devices 142–146 use the PCI bus arbitration to gain control of the real-time bus 130.

The PCI devices 142–146 may be any of various types of input/output devices, including multimedia devices and communication devices. For example, the PCI devices 142–146 may comprise video accelerator or graphics accelerator cards, video playback cards, MPEG decoder cards, sound cards, network interface cards, SCSI adapters for interfacing to various input/output devices, such as CD-ROMS and tape drives, or other devices as desired.

Thus, the PCI devices 142–146 communicate with each other via the PCI bus 120 and also communicate with the CPU and main memory 110 via the PCI bus 120, as is well known in the art. The PCI devices 142–146 also communicate data between each other using the real-time bus or multimedia bus 130. When the PCI devices 142–146 communicate using the real-time bus 130, the devices are not required to obtain PCI bus mastership and they do not consume PCI bus cycles.

Expansion bus bridge logic 150 may also be coupled to the PCI bus 120. The expansion bus bridge logic 150 interfaces to an expansion bus 152. The expansion bus 152 may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, such as expansion bus memory or a modem (both not shown).

FIG. 2—MOTHERBOARD

Figure 2:
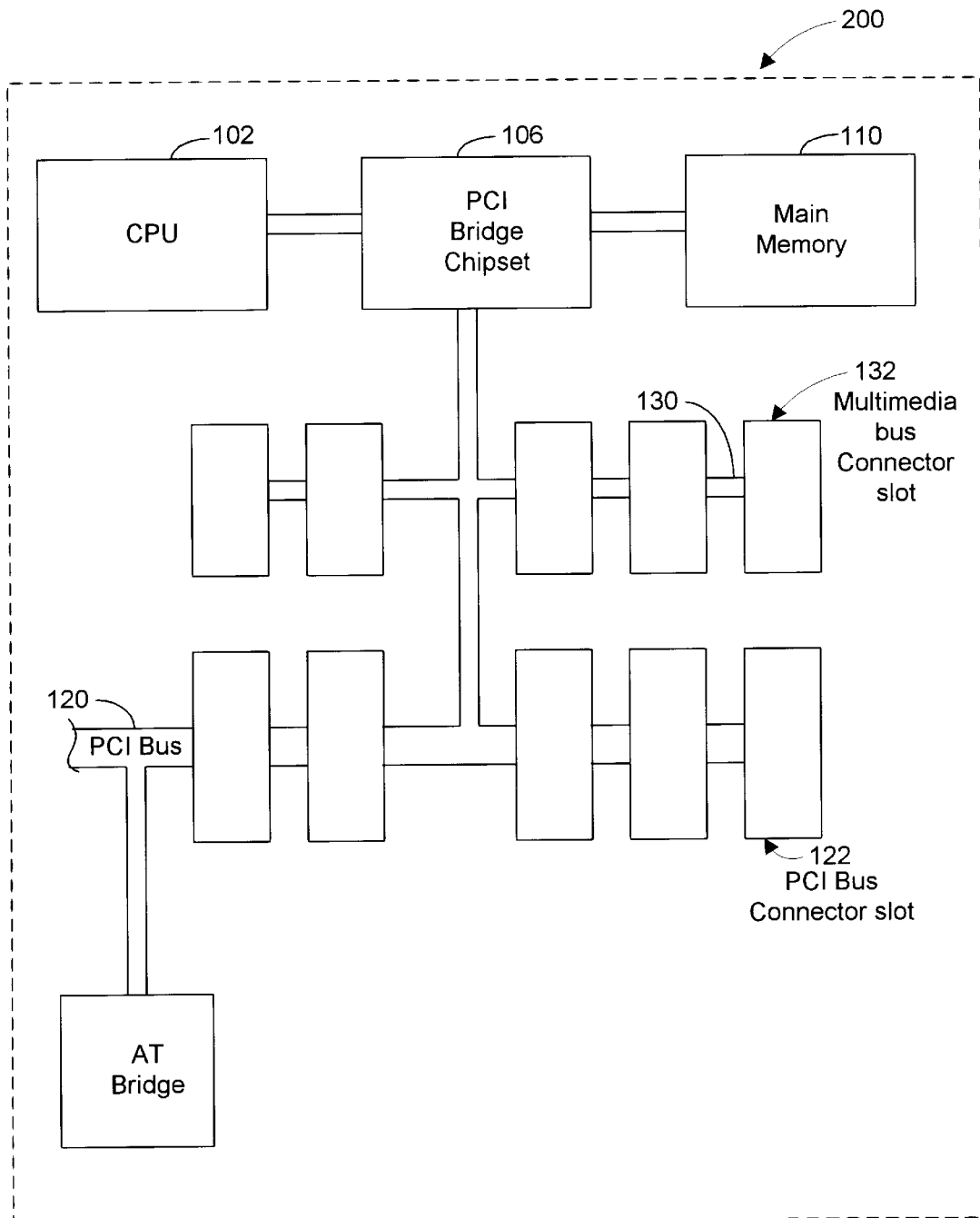
FIG. 2 is a block diagram of the motherboard of the computer system of FIG. 1.

Referring now to FIG. 2, a block diagram of motherboard 200 of the computer system of FIG. 1 is shown. As shown, the various devices and buses are preferably comprised on the motherboard 200. The motherboard 200 comprises the CPU 102, the chipset logic 106, the main memory 110, the PCI bus 120, and the real-time or multimedia bus 130.

The motherboard 200 also includes a plurality of PCI bus connector slots 122 which are electrically connected to the PCI bus 120. The connector slots 122 are adapted for receiving a corresponding or mating edge connector of an expansion card that is adapted for insertion into the PCI connector slots 122. The motherboard 200 also includes a plurality of real-time bus connector slots 132 which are adapted to receive corresponding or mating edge connectors of expansion cards.

As shown, each of the multimedia bus connector slots 132 corresponds to a respective one of at least a subset of the PCI bus connector slots 122. In one embodiment, the motherboard 200 includes a first plurality of PCI bus connector slots 122 and a second lesser plurality of multimedia bus connector slots 132.

FIG. 4—EXPANSION CARD

Figure 4:
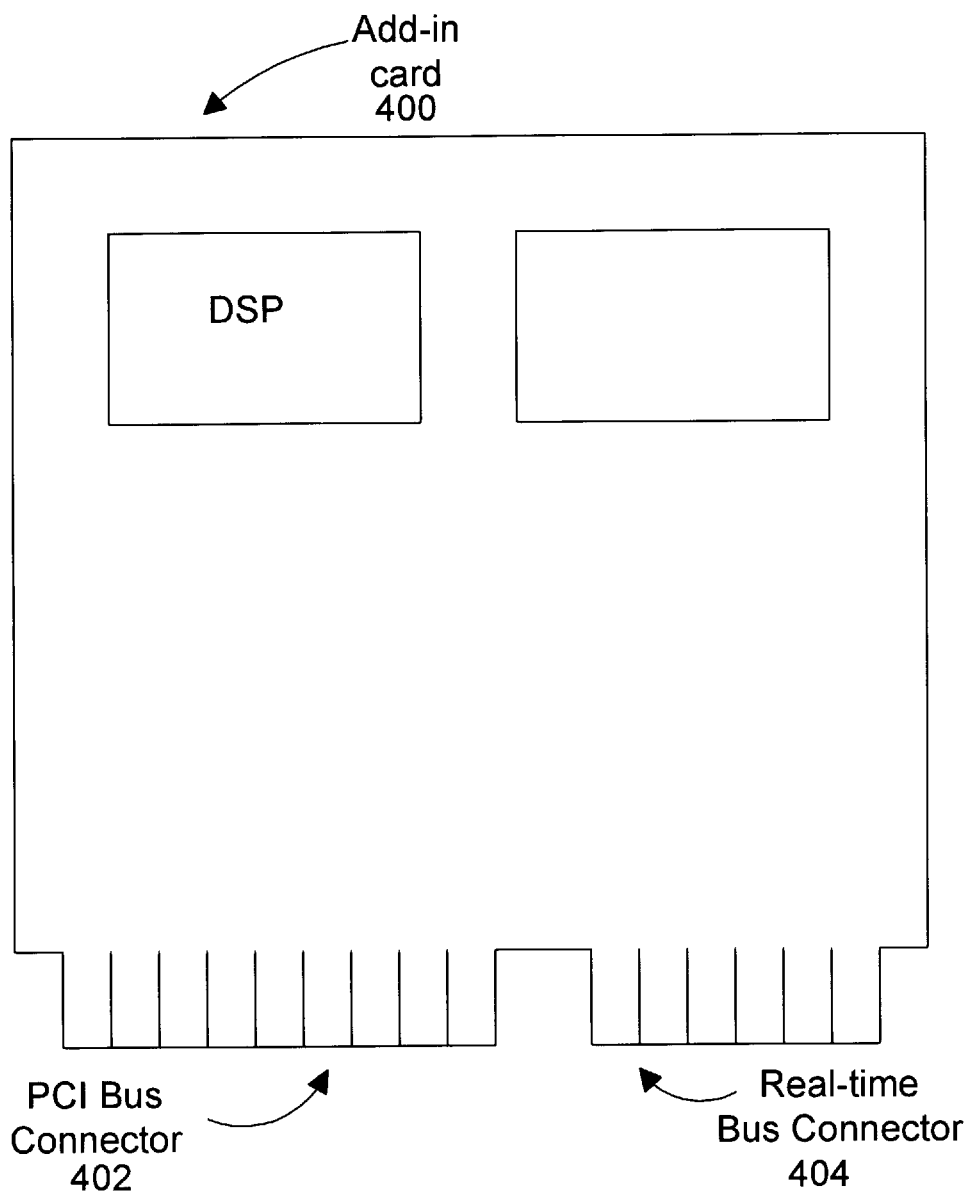
FIG. 4 illustrates a modular add-in card including a local expansion bus connector and a real-time bus connector according to the present invention.

Referring now to FIG. 4, an expansion card or add-in card 400 is shown, which comprises one of the PCI devices 142–146. As shown, a PCI expansion card 400 according to the present invention includes a PCI bus connector 402 which is adapted for insertion into a PCI expansion bus connector slot 122 for electrically coupling to the PCI bus 120. The adapter card 400 also includes a real-time bus connector 404 according to the present invention, which is adapted for insertion into connector slot 132 of the real-time bus 130.

Thus, one or more of the PCI devices 142–146 are comprised on a modular expansion card 400 including PCI bus connector 402 and real-time bus connector 404. This configuration allows for more modular and upgradeable expansion options in the computer system. This also provides the benefits of a PCI local expansion bus coupled with a real-time bus 130 for additional data bandwidth and multimedia real-time data transfer capabilities.

The present invention is also backwards compatible with existing PCI devices. For example, existing prior art PCI devices include PCI bus connector 402 but do not include a real-time bus connector 404. These prior art PCI devices are simply inserted into a respective PCI expansion slot 122, and the corresponding real-time connector slot 132 is not used for that respective PCI expansion slot 122. Thus, the computer system motherboard 200 shown in FIG. 2 may receive prior art PCI devices or may receive new expansion cards 400 according to the present invention which include both a PCI bus connector 402 and real-time bus connector 404.

FIG. 3—ALTERNATE EMBODIMENT

Figure 3:
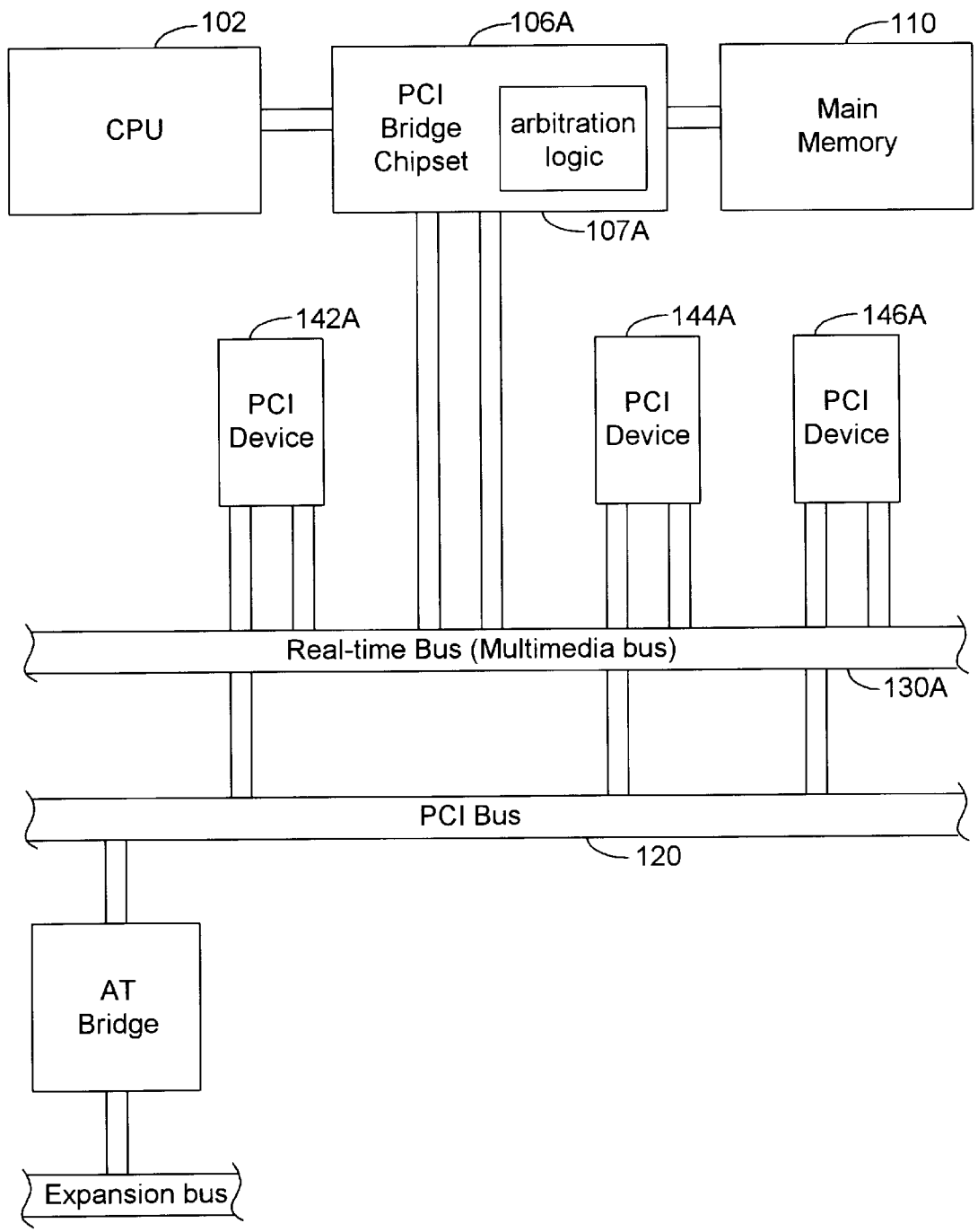
FIG. 3 is a block diagram of an alternate embodiment of the computer system of FIG. 1.

Referring now to FIG. 3, an alternate embodiment of the computer system of FIG. 1 is shown. In the embodiment of FIG. 3, chipset logic 106A is connected to both the local expansion bus 120 as well as real-time bus 130A. In this embodiment, the real-time bus 130A may be different from the real-time bus 130 shown in FIG. 1 to accommodate CPU accesses through the chipset logic 106A to the real-time bus 130A, and also to accommodate peripheral device accesses through the real-time bus 130A and chipset logic 106A to main memory 110. Also, multimedia devices 142A–146A which are coupled to the PCI bus 120 and the real-time bus 130A may be different from the multimedia devices 142–146 in FIG. 1 to accommodate accesses through the real-time bus 130A to main memory 110.

Thus, in this embodiment, the chipset logic 106A can communicate directly to the PCI bus 120, and can also communicate directly with the real-time bus 130. This facilitates operation of the CPU 102 communicating with the PCI devices 142A–146A through both the PCI bus 120 and the real-time bus 130A. In addition, one or more of the PCI devices 142–146 can use the real-time bus 130A to interface through the chipset logic 106A to the main memory 110 as desired.

In this embodiment, the arbitration logic 149 is preferably not included, and arbitration logic 107A in the chipset 106A preferably performs arbitration for both the PCI bus 120 and the real-time bus 130.

FIG. 5—MULTIMEDIA MEMORY EMBODIMENT

Figure 5:
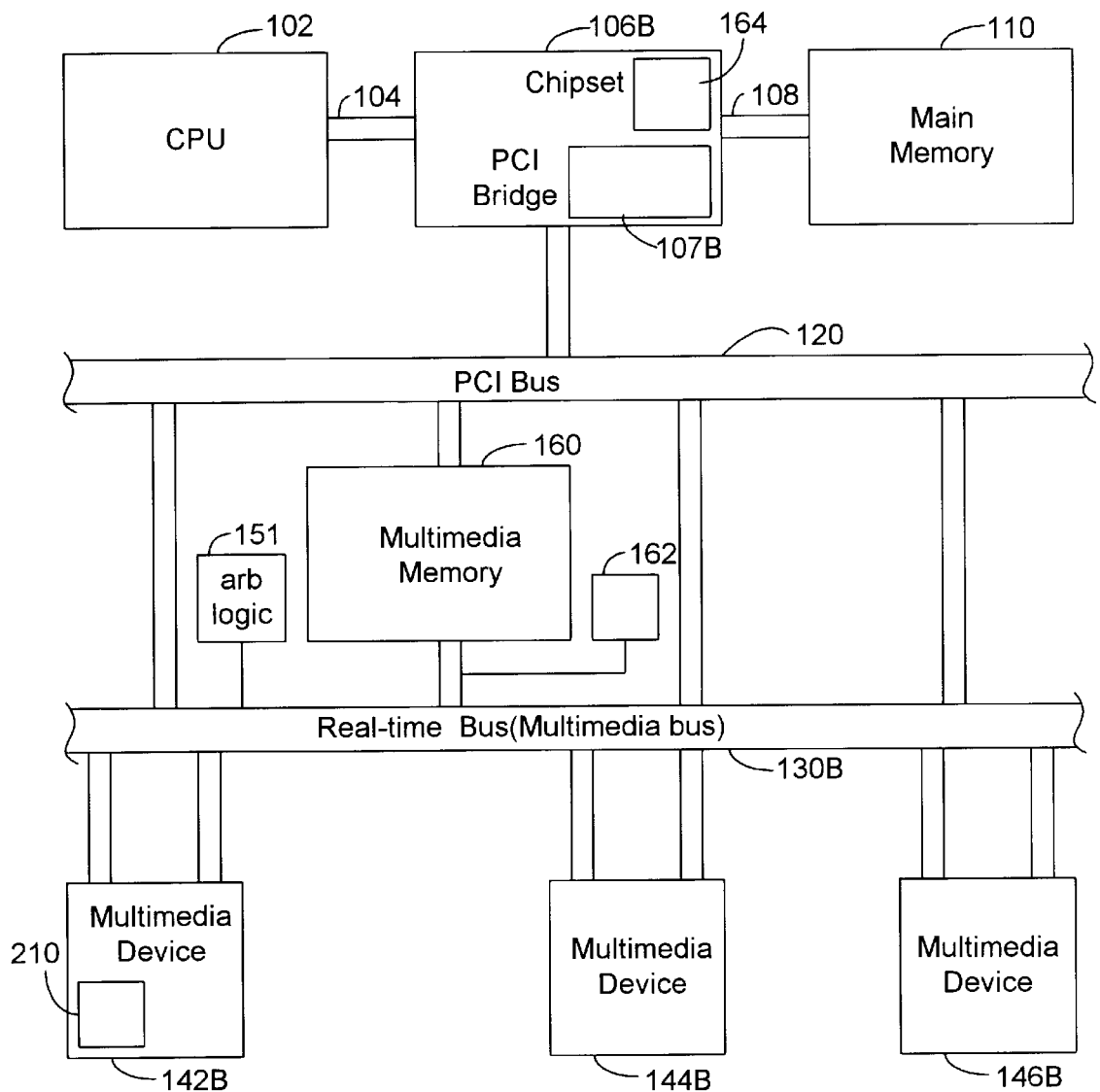
FIG. 5 is a block diagram of a computer system including a local expansion bus and a real-time bus and including a multimedia memory according to an alternate embodiment of the present invention.
Figure 6:
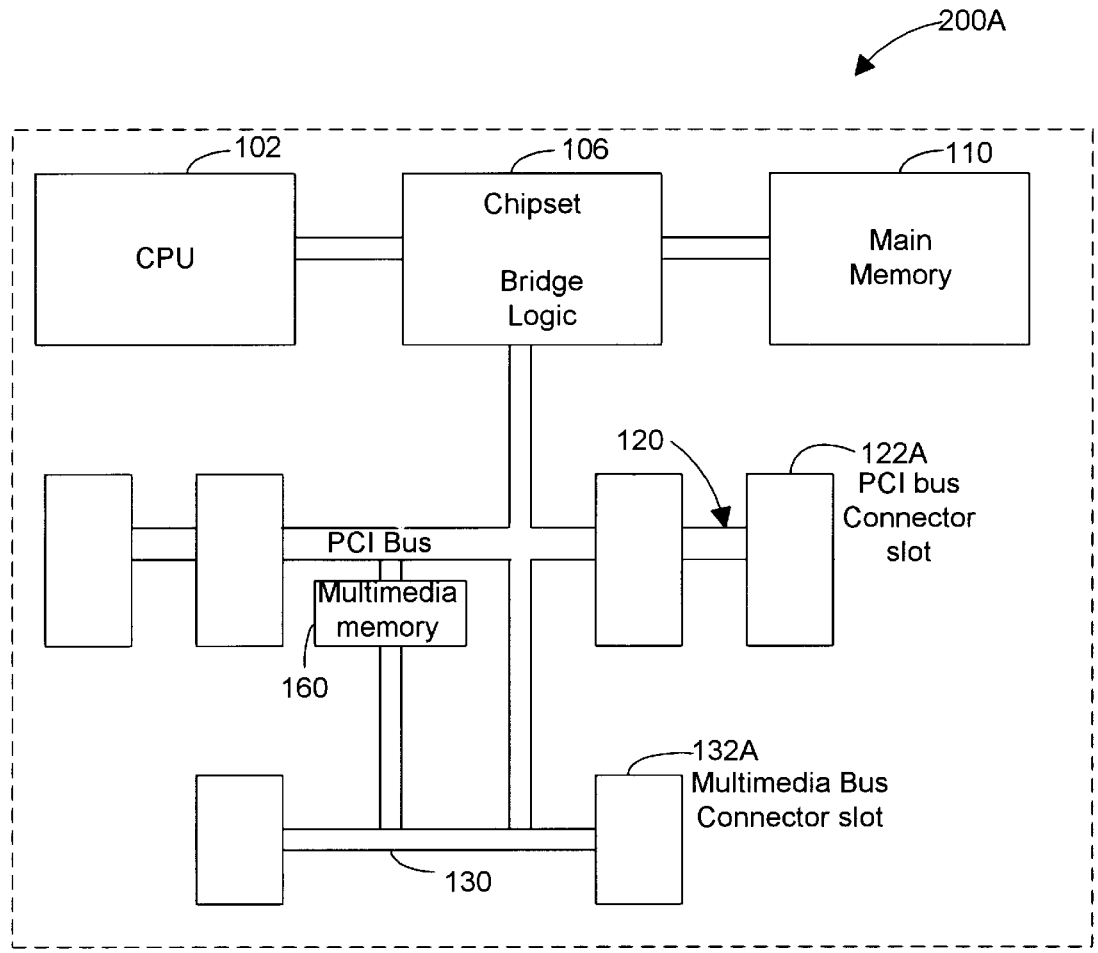
FIG. 6 is a block diagram of the motherboard of the computer system of FIG. 5.

Referring now to FIG. 5, a block diagram of the computer system according to an alternate embodiment of the present invention and including a multimedia memory 160 is shown. The computer system of FIG. 5 is similar to the computer system of FIG. 1. However, the computer system of FIG. 5 includes a multimedia memory 160 coupled to each of the PCI bus 120 and to the real-time bus 130. In the following description, elements which are preferably identical to elements previously described include the same reference numerals for convenience.

As shown, the computer system includes a central processing unit (CPU) 102 which is coupled through a CPU local bus 104 to a host/PCI/cache bridge or chipset 106B. The chipset 106B includes arbitration logic 107B according to the present invention. The chipset 106B is preferably similar to the Triton chipset available from Intel Corporation, including certain arbiter modifications to accommodate the real-time bus 130B and the multimedia memory 160 of the present invention. A second level or L2 cache memory (not shown) may be coupled to a cache controller in the chipset, as desired. The bridge or chipset 106B couples through a memory bus 108 to main memory 110. The main memory 110 is preferably DRAM (dynamic random access memory) or EDO (extended data out) memory, or other types of memory, as desired.

The chipset logic 106B preferably includes a memory controller for interfacing to the main memory 110 and also includes the arbitration logic 107B. The chipset logic 106B preferably includes a direct memory access (DMA) system or engine 164 which performs various DMA operations. The chipset logic 106B preferably includes other various peripherals, including an interrupt system, a real time clock (RTC) and timers, and ROM/Flash memory (all not shown). Other peripherals (not shown) are preferably comprised in the chipset 106B, including communications ports, diagnostics ports, command/status registers, and non-volatile static random access memory (NVSRAM).

The host/PCI/cache bridge or chipset 106B interfaces to a local expansion bus 120. In the preferred embodiment, the local expansion bus 120 is the peripheral component interconnect (PCI) bus 120. However, it is noted that other local buses may be used, such as the VESA (Video Electronics Standards Association) VL bus. Various types of devices may be connected to the PCI bus 120.

The computer system shown in FIG. 5 also includes a real-time bus, also referred to as a multimedia bus 130B. The real-time bus 130B preferably includes a 32 or 64 bit data path and may also include address and control portions. The real-time bus 130B may be identical to either the real-time bus 130 shown in FIG. 1 or the real-time bus 130A shown in FIG. 1. Alternatively, the real-time bus 130B includes various address and control signals for accessing the multimedia memory 160.

Multimedia memory 160 is coupled to each of the PCI bus 120 and the real-time bus 130B. In the embodiment of FIG. 5, the multimedia memory 160 is preferably dual ported memory. In this embodiment, a first port of the memory 160 couples to the PCI bus 120. The second port of the multimedia memory 160 couples to the real-time bus 30B. The multimedia memory 160 preferably comprises high speed dual ported VRAM (video random access memory), or dual ported DRAM (dynamic random access memory) or SRAM (static random access memory). The computer system preferably includes a dual port DRAM memory controller 162 for controlling the dual port memory functions of the multimedia memory 160. For more information on the operation of a dual port memory controller, please see the Intel 8207 Dual-Port Dynamic RAM Controller Data Sheet (Order No. 210463-007), available from Intel Corporation, which is hereby incorporated by reference.

In the preferred embodiment, the real-time bus 130B includes only a 32 bit or 64 bit data path and does not include address or control portions. In one embodiment, devices use the PCI bus 120 for addressing and control and use the multimedia or real-time bus 130B for high speed data transfers between each other and also to/from the multimedia memory 160. Thus, in one embodiment, devices use the PCI bus 120 to provide addressing and control signals to the multimedia memory 160 and use the multimedia or real-time bus 130 for high speed data transfers to and from the multimedia memory 160.

One or more PCI devices 142B, 144B, and 146B are coupled to each of the PCI bus 120 and the real-time bus 130B. The PCI devices 142B–146B include standard PCI interface circuitry for communicating on the PCI bus 120. The PCI devices 142B–146B also include interfaces to the real-time bus 130B. The PCI devices 142B–146B use the real-time bus 130B to communicate data between the respective devices. As described further below, one or more of the PCI devices 142B–146B may be comprised on modular expansion cards adapted for insertion into respective slots of each of the real-time bus 130B and PCI bus 120.

In one embodiment, arbitration logic 151 is coupled to the real-time bus 130B and performs arbitration for the devices 142B–146B on the bus 130B. In this embodiment, the PCI devices 142B–146B provide request signals on the real-time bus 130B, and the arbitration logic 151 grants bus access according to a desired arbitration method. Alternatively, the arbitration logic 151 is not included, and the PCI devices 142B–146B use the PCI bus arbitration to gain control of the real-time bus 130B.

The PCI devices 142B–146B may be any of various types of input/output devices, including multimedia devices and communication devices. For example, the PCI devices 142B–146B may comprise video accelerator or graphics accelerator cards, video playback cards, MPEG decoder cards, sound cards, network interface cards, SCSI adapters for interfacing to various input/output devices, such as CD-ROMS and tape drives, or other devices as desired.

Thus, the PCI devices 142B–146B communicate with each other via the PCI bus 120 and communicate with the CPU and main memory 110 via the PCI bus 120, as is well known in the art. The PCI devices 142B–146B also communicate data between each other and the multimedia memory 160 using the real-time bus or multimedia bus 130B. When the PCI devices 142B–146B communicate using the real-time bus 130B, the devices are not required to obtain PCI bus mastership and they do not consume PCI bus cycles. In one embodiment, the PCI devices 142B–146B communicate with the multimedia memory 160 using either or both of the real-time bus 130B and the PCI bus 120.

Expansion bus bridge logic (not shown) may also be coupled to the PCI bus 120. The expansion bus bridge logic interfaces to a secondary expansion bus (also not shown). The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus, such as expansion bus memory or a modem (both not shown).

In the embodiment of FIG. 5, each of the multimedia devices 142B–146B include PCI interface logic for coupling to the PCI bus 120 and also include real-time bus interface logic for interfacing to the real-time bus 130B. Each of the multimedia devices 142B–146B also include arbitration logic for gaining control of the real-time bus 130 and further include logic which gains access to the multimedia memory 160. Thus, each of the multimedia devices 142b–146B can gain control of the real-time bus 130B and access the multimedia memory 160 to retrieve desired code and data.

Figure 7:
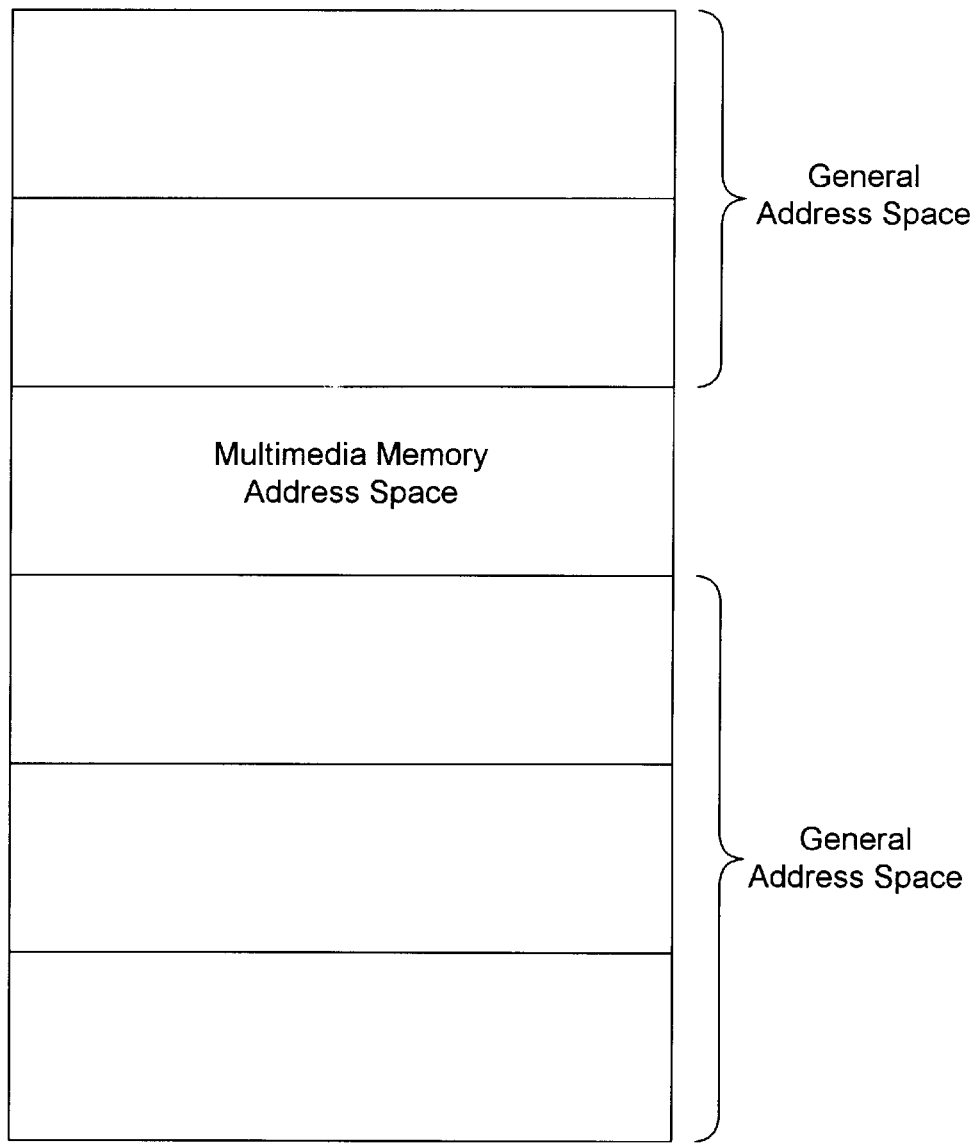
FIG. 7 illustrates the address space of the main memory and the multimedia memory.

In the embodiment of FIG. 5, the multimedia memory 160 is mapped to the main memory address space and thus comprises a portion of the main memory address space, as shown in FIG. 7. Thus the multimedia memory 160 is available to store non-multimedia data as needed. In other words, if the main memory 110 becomes full and additional memory is needed, the CPU 102 can store code and data in the multimedia memory 160. Thus, in the embodiment the multimedia memory 160 is used for real-time or multimedia data and is also used by the CPU 102 as overflow memory space.

In the embodiment shown in FIG. 5, one or more of the multimedia devices 142B–146B includes at least one DSP engine 210 which preferably performs a multimedia or communications function, such as video and audio processing functions. In the preferred embodiment, the DSP engine 210 is a general purpose DSP engine that is programmable to perform either video or audio processing functions as well as other real-time functions. In one embodiment, the DSP engine 210 includes one or more ROMs or RAMs which store microcode or instructions corresponding to video and audio processing instructions or commands. When programmed as a graphics accelerator, the DSP engine 210 preferably performs video and graphics functions such as polygon rendering and texture mapping, among others. When programmed as a sound card, the DSP engine 210 preferably performs audio functions such as MIDI and wavetable synthesis, among others. The DSP engine 210 may also be programmed to perform communication functions, such as ISDN connectivity or modem functionality, as desired.

In the embodiment shown in FIG. 5, the chipset 106B preferably includes DMA transfer engine 164 which performs data transfers between the main memory 110 and the multimedia memory 160. The DMA transfer engine 164 preferably transfers data from the main memory 110 to the multimedia memory 160 contemporaneously with operations performed by the one or more multimedia devices 142B–146B. In one embodiment, the multimedia memory 160 is partitioned into two or more separate address spaces or buffers, and the DMA engine 164 transfers data from main memory 110 to a first address space or buffer in the multimedia memory 160 while one of the PCI devices 142B–146B accesses commands and data from the other address space or buffer.

As mentioned above, the main memory 110 and the multimedia memory 160 preferably share a common address space. FIG. 7 illustrates the main memory address space, wherein the multimedia memory 160 comprises part of the main memory address space. Thus the multimedia memory 160 is available to store non-multimedia data as needed. In this embodiment, each of the multimedia devices 142B–146B and CPU 102 must also arbitrate for access to the multimedia memory 160. The multimedia devices 142B–146B preferably have priority access to the multimedia memory 160. In one embodiment, a multimedia device simply writes one or more bits to a register in the arbitration logic 107B in the chipset 106B to gain control of the multimedia memory 160, and the CPU 102 is only granted access to the multimedia memory 160 during idle times or after a certain starvation period.

COMPUTER SYSTEM OPERATION

Figure 8:
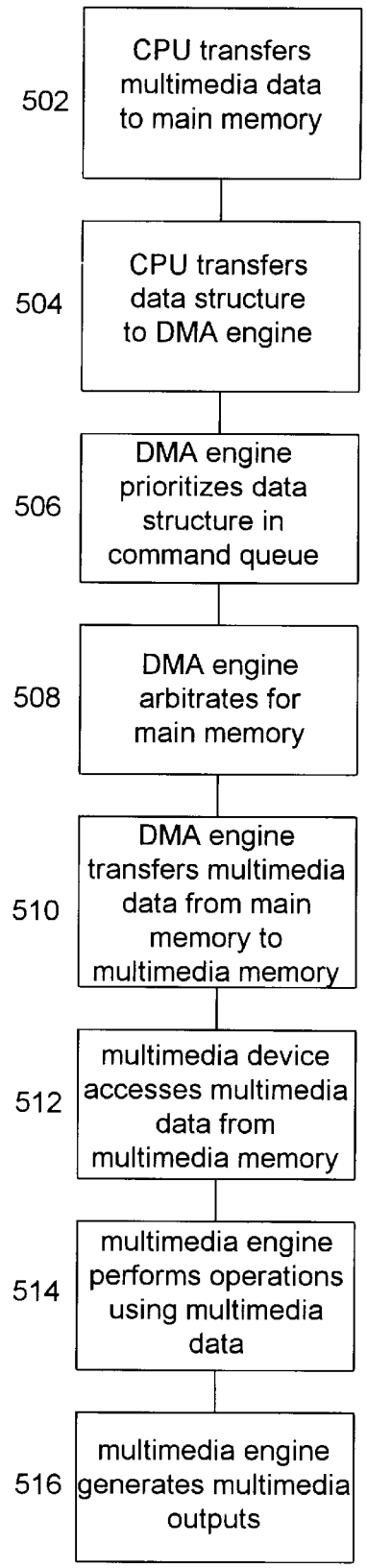
FIG. 8 is a flowchart diagram illustrating operation of data transfers from the main memory to the multimedia memory.

FIG. 8 is a flowchart diagram illustrating operation of the present invention. In the preferred embodiment, the main memory 110 stores the operating system and applications software as well as driver software, including video drivers and audio drivers. The CPU 102 executes applications software and driver software from the main memory 110 and generates real-time or multimedia data. In the present disclosure, the term "multimedia data" refers to video or graphical data, audio data, telephony data, and other types of real-time or communication data.

When an application executing on the CPU 102 generates multimedia data, the CPU 102 preferably transfers or writes the multimedia data to the main memory 110 in step 502. The multimedia data includes data and may include one or more commands that perform operations on the data.

In an alternate embodiment, the CPU 102 provides the multimedia data directly to the multimedia memory 160 through the PCI bus 120, and operation proceeds directly to step 512. In this embodiment, the CPU 102 provides the multimedia data through the PCI bus 120 directly to the multimedia memory 160, and the multimedia devices 142B–146B access commands and data from the multimedia memory 160 through the multimedia bus 130B.

After the CPU 102 preferably writes the multimedia data to the main memory 110 in step 502, the CPU 102 then provides a data structure directly to the DMA engine 164 in the chipset logic 106B in step 504. The data structure comprises location information regarding the multimedia data, including the beginning address of the data, the length or number of bytes of the data, as well as other information. Alternatively, the CPU 102 provides the data structure to buffers within the DMA engine 164. The data structure may also include high level instructions or commands regarding the nature or purpose of the data. In one embodiment, the data structure references a linked list of data, wherein the last data value in each data block comprises a pointer to the next data block.

In step 506 the DMA engine 164 prioritizes the data structure with other real-time data structures that have already been received. Thus the DMA engine 164 intelligently prioritizes received multimedia data structures based on a desired priority scheme and the available resources. Thus, the video and audio components of a multimedia presentation may receive a higher priority than a telephony application that can be performed in the background. In an alternate embodiment, the DMA engine 164 does not prioritize received data structures or commands, but rather merely acts as a slave and executes received data structures in the order they are received.

In step 508 the DMA engine 164 arbitrates for access to the main memory 110. This involves asserting a bus request signal to the arbitration logic 107B in the chipset 106B. The DMA engine 164 may also provide a priority byte to the arbitration logic 107B which is used by the arbitration logic 107B in determining the arbitration. Once the DMA engine 164 achieves access to main memory 110, the DMA engine 164 uses the data structure received from the CPU 102 to access the real-time data from main memory 110 and store the data in the multimedia memory 160 in step 510.

In one embodiment, the CPU 102 writes video or audio instructions or commands to the main memory 110 in conjunction with the corresponding video and/or audio data. In this embodiment, the CPU 102 writes only pointer information to the DMA engine 164 which points to the beginning address in main memory 110 where the data and commands reside. The pointer information includes the beginning address of the data, the length or number of bytes of the data, as well as other information. In step 510 the DMA engine 164 uses the pointer information to retrieve the commands and data from main memory 110 into the multimedia memory 160.

Once real-time or multimedia data and commands have been placed in the multimedia memory 160, either by the CPU 102 or retrieved from main memory 110, in step 512 one or more of the multimedia devices 142B–146B read the commands and data from the multimedia memory 160 and in step 514 perform the necessary graphics and audio processing functions. The respective multimedia device 142B–146B then generates the appropriate video and audio signals to the video and audio ports in step 516. In one embodiment, the multimedia memory 160 is partitioned into separate address spaces for commands and data, and the multimedia device retrieves commands from a first address space and retrieves data from a second address space.

The CPU 102 preferably writes video and/or audio commands and data to the main memory 110 instead of directly to the multimedia memory 160 in order to minimize CPU accesses to the multimedia memory 160. This ensures that the multimedia devices 142B–146B have full access to the multimedia memory 160 for real-time processing. Further, the multimedia devices 142B–146B retrieve commands and data from the main memory 110 only when necessary, and the multimedia devices 142B–146B are not "locked out" of the multimedia memory 160 due to CPU writes to the multimedia memory 160.

In an alternate embodiment, as mentioned above, the CPU 102 writes video and/or audio data and commands directly to the multimedia memory 160. In this embodiment, the CPU 102 executes applications software and driver software from the main memory 110 and writes any associated video and audio data directly to the multimedia memory 160. The driver software also writes high level commands directly to the multimedia memory 160. Thus, the video drivers write high level commands to the multimedia memory 160 in a similar manner to current PCI-based graphics acceleration cards.

In one embodiment, the multimedia memory 160 is separated into two or more address spaces or buffers, and the CPU 102 writes to one address space or buffer while the one or more multimedia devices 142B–146B accesses commands and data from the other address space or buffer. This ensures that the multimedia devices 142B–146B have uninterrupted access to commands and data in the multimedia memory 160 while also allowing the CPU 102 to directly write real-time commands and data to the multimedia memory 160.

CONCLUSION

Therefore, the present invention comprises a novel computer system architecture which increases the performance of real-time applications. The computer system includes a PCI local bus and a real-time bus. A dedicated multimedia engine is coupled directly to the main memory, and the multimedia engine includes dedicated multimedia memory which is part of the main memory address space. This allows the multimedia memory to be used for multimedia data as well as for additional main memory storage.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer system, comprising:

a CPU;

main memory which stores data accessible by the CPU;

bridge logic coupled to the CPU and to the main memory, wherein the bridge logic includes a memory controller coupled to the main memory and also includes expansion bus interface logic;

an expansion bus coupled to the bridge logic, wherein said expansion bus includes a plurality of data lines and control lines;

a multimedia bus, wherein said multimedia bus includes a plurality of data lines for transmitting data;

a multimedia memory directly connected to said expansion bus and also directly connected to said multimedia bus, wherein said multimedia memory stores multimedia data used for video and audio processing;

a plurality of multimedia devices directly connected to said expansion bus and directly connected to said multimedia bus, wherein each of said multimedia devices include interface logic for accessing said multimedia bus and performing transfers on said multimedia bus, wherein one or more of said multimedia devices access said multimedia data in said multimedia memory.

2. The computer system of claim 1, wherein said multimedia memory is a dual ported memory including a first port coupled to said expansion bus and including a second port coupled to said multimedia bus.

3. The computer system of claim 1, further comprising:

a dual port memory controller coupled to said multimedia memory which regulates access to said multimedia memory from said expansion bus and said multimedia bus.

4. The computer system of claim 1, wherein said CPU transfers multimedia data to said multimedia memory through said expansion bus; and wherein one or more of said multimedia devices access said multimedia data in said multimedia memory through said multimedia bus.

5. The computer system of claim 1, wherein said bridge logic further comprises:

a direct memory access engine coupled to said CPU and said expansion bus which transfers multimedia data from said main memory to said multimedia memory through said expansion bus; and wherein one or more of said multimedia devices access said multimedia data in said multimedia memory through said multimedia bus.

6. The computer system of claim 1, further comprising:

multimedia bus arbitration logic coupled to said multimedia bus, wherein said multimedia bus arbitration logic receives multimedia bus access requests from one or more of said multimedia devices and grants multimedia bus access to one of said multimedia devices.

7. The computer system of claim 1, wherein said bridge logic further comprises:

expansion bus arbitration logic coupled to said CPU and said expansion bus, wherein said expansion bus arbitration logic receives expansion bus access requests from one or more of said multimedia devices and grants expansion bus access to one of said one or more multimedia devices.

8. The computer system of claim 1, further comprising:

a plurality of expansion bus connector slots coupled to said expansion bus for receiving add-in cards; and a plurality of multimedia bus connector slots coupled to said multimedia bus for receiving add-in cards, wherein said plurality of multimedia bus slots correspond to at least a subset of said plurality of expansion bus slots;

wherein one or more of said multimedia devices comprise add-in cards having connectors adapted for insertion into said expansion bus connector slots and said multimedia bus connector slots.

9. The computer system of claim 1, wherein said expansion bus is the peripheral component interconnect (PCI) bus.

10. The computer system of claim 1, wherein said multimedia data comprises video data and audio data.

11. The computer system of claim 5, wherein said CPU includes means for transferring a data structure to the direct memory access engine, wherein said data structure comprises location information regarding the multimedia data;

wherein said direct memory access engine uses said data structure to transfer multimedia data from said main memory to said multimedia memory.

12. The computer system of claim 6, wherein said multimedia bus is an isochronous bus, wherein said multimedia bus arbitration logic receives multimedia bus bandwidth requests from one or more of said multimedia devices and grants said requested amount of multimedia bus bandwidth to one of said one or more multimedia devices.

13. The computer system of claim 7, wherein said expansion bus arbitration logic is further coupled to said multimedia bus;

wherein said expansion bus arbitration logic further receives multimedia bus access requests from one or more of said multimedia devices and grants multimedia bus access to one of said one or more multimedia devices.

14. A method for performing multimedia operations in a computer system, wherein the computer comprises a CPU, main memory which stores data accessible by the CPU, bridge logic coupled to the CPU and the main memory, the bridge logic including an expansion bus coupled to the bridge logic, the bridge logic further including a direct memory access engine coupled to said CPU and said expansion bus, a multimedia bus which stores multimedia data, a multimedia memory directly connected to the expansion bus and directly connected to the multimedia bus, and a plurality of devices directly connected to said expansion bus and directly connected to said multimedia bus, said plurality of devices including a multimedia device, the method comprising:

the CPU transferring multimedia data to the main memory;

the CPU transferring a data structure to the direct memory access engine, wherein the data structure comprises location information regarding the multimedia data;

the direct memory access engine transferring the multimedia data from the main memory to the multimedia memory, wherein the direct memory access engine uses said data structure to access said multimedia data from the main memory;

the multimedia device accessing said multimedia data from the multimedia memory; and the multimedia device performing operations using said multimedia data after said step of accessing said multimedia data from the multimedia memory.

15. The method of claim 14, wherein the multimedia memory comprises dual ported memory including a first port directly connected to the expansion bus and a second port directly connected to the multimedia bus; the method further comprising:

the direct memory access engine transferring said multimedia data from the main memory through the expansion bus and to the first port of the multimedia memory; and the multimedia device accessing second multimedia data from the second port of the multimedia memory through the multimedia bus.

16. The method of claim 14, wherein the multimedia memory includes a plurality of address space portions including a first address space portion and a second address space portion; the method further comprising:

the direct memory access engine transferring first multimedia data from the main memory to said first address space portion in said multimedia memory;

said multimedia device accessing second multimedia data from said second address space portion in said multimedia memory contemporaneously with said transferring said first multimedia data from the main memory to said first address space portion in said multimedia memory.

17. The method of claim 14, wherein said multimedia location information includes a beginning main memory address of said multimedia data and a number of bytes of said multimedia data.

18. The method of claim 14, wherein said data structure includes said multimedia data location information and includes a priority value indicating a relative priority of said multimedia data.

19. The method of claim 14, wherein said multimedia data comprises data and one or more commands, wherein said commands indicate desired operations on said data.

20. The method of claim 14, wherein said multimedia memory for storing multimedia data and said main memory comprise a common address space.

21. The method of claim 14, wherein the computer system further comprises arbitration logic coupled to said CPU, said main memory and said direct memory access engine, wherein said arbitration logic receives main memory access requests from an element of the group consisting of said CPU and said direct memory access engine and grants main memory access to said element, the method further comprising:

the direct memory access engine requesting access to the main memory prior to said step of the direct memory access engine transferring the multimedia data from the main memory to the multimedia memory; and the arbitration logic granting the direct memory access engine access to the main memory prior to said step of the direct memory access engine transferring the multimedia data from the main memory to the multimedia memory.

22. The method of claim 18 wherein said direct memory access engine includes a command queue for storing a plurality of said data structures, the method further comprising:

the direct memory access engine prioritizing said data structure in said command queue based on said priority value comprised in said data structure, wherein said step of prioritizing occurs prior to said step of the direct memory access transfer engine transferring the multimedia data from the main memory to the multimedia memory.

23. A method for performing multimedia operations in a computer system, wherein the computer comprises a CPU, main memory which stores data accessible by the CPU, bridge logic coupled to the CPU and the main memory, the bridge logic including an expansion bus coupled to the bridge logic, a multimedia bus which stores multimedia data, a multimedia memory coupled to the expansion bus and to the multimedia bus, wherein the multimedia memory includes a plurality of address space portions including a first address space portion and a second address space portion, and a plurality of devices coupled to said expansion bus and said multimedia bus, said plurality of devices including a multimedia device, the method comprising:

the CPU transferring multimedia data to the main memory;

the CPU transferring a data structure to a direct memory access engine, wherein the data structure comprises location information regarding the multimedia data;

the direct memory access engine transferring first multimedia data from the main memory to said first address space portion in said multimedia memory, wherein the direct memory access engine uses said data structure to access said first multimedia data from the main memory;

the multimedia device accessing second multimedia data from said second address space portion in said multimedia memory contemporaneously with said transferring said first multimedia data from the main memory to said first address space portion in said multimedia memory; and the multimedia device performing operations using said multimedia data after said step of accessing said multimedia data from the multimedia memory.

24. A method for performing multimedia operations in a computer system, wherein the computer comprises a CPU, main memory which stores data accessible by the CPU, bridge logic coupled to the CPU and the main memory, the bridge logic including an expansion bus coupled to the bridge logic, a multimedia bus which stores multimedia data, a multimedia memory coupled to the expansion bus and to the multimedia bus, and a plurality of devices coupled to said expansion bus and said multimedia bus, said plurality of devices including a multimedia device, the method comprising:

the CPU transferring multimedia data to the main memory;

the CPU transferring a data structure to a direct memory access engine, wherein the data structure comprises location information regarding the multimedia data, wherein the data structure also comprises a priority value indicating a relative priority of said multimedia data;

the direct memory access engine transferring the multimedia data from the main memory to the multimedia memory, wherein the direct memory access engine uses said data structure to access said multimedia data from the main memory;

the multimedia device accessing said multimedia data from the multimedia memory; and the multimedia device performing operations using said multimedia data after said step of accessing said multimedia data from the multimedia memory.

25. The method of claim 24, wherein said direct memory access engine includes a command queue for storing a plurality of said data structures, the method further comprising:

the direct memory access engine prioritizing said data structure in said command queue based on said priority value comprised in said data structure, wherein said step of prioritizing occurs prior to said step of the direct memory access transfer engine transferring the multimedia data from the main memory to the multimedia memory.

26. A method for performing multimedia operations in a computer system, wherein the computer comprises a CPU, main memory which stores data accessible by the CPU, bridge logic coupled to the CPU and the main memory, the bridge logic including an expansion bus coupled to the bridge logic, said bridge logic further including a direct memory access engine coupled to said CPU and said expansion bus, wherein said direct memory access engine includes a command queue, a multimedia bus which stores multimedia data, a multimedia memory coupled to the expansion bus and to the multimedia bus, and a plurality of devices coupled to said expansion bus and said multimedia bus, said plurality of devices including a multimedia device, the method comprising:

the CPU transferring multimedia data to the main memory;

the CPU transferring a data structure to the direct memory access engine, wherein the data structure comprises location information regarding the multimedia data, wherein said data structure also includes a priority value indicating a relative priority of said multimedia data;

the direct memory access engine prioritizing said data structure in said command queue based on said priority value comprised in said data structure;

the direct memory access engine transferring the multimedia data from the main memory to the multimedia memory, wherein the direct memory access engine uses said data structure to access said multimedia data from the main memory;

the multimedia device accessing said multimedia data from the multimedia memory; and the multimedia device performing operations using said multimedia data after said accessing said multimedia data from the multimedia memory.

27. A computer system, comprising:

a CPU;

main memory which stores data accessible by the CPU;

bridge logic coupled to the CPU and to the main memory, wherein the bridge logic includes a memory controller coupled to the main memory and also includes expansion bus interface logic;

an expansion bus coupled to the bridge logic, wherein said expansion bus includes a plurality of data lines and control lines;

a multimedia bus, wherein said multimedia bus includes a plurality of data lines for transmitting data;

a multimedia memory coupled to said expansion bus and also coupled to said multimedia bus, wherein said multimedia memory stores multimedia data used for video and audio processing;

a plurality of multimedia devices coupled to said expansion bus and to said multimedia bus, wherein each of said multimedia devices include interface logic for accessing said multimedia bus and performing transfers on said multimedia bus, wherein one or more of said multimedia devices access said multimedia data in said multimedia memory; and a multimedia bus arbitration logic coupled to said multimedia bus, wherein said multimedia bus arbitration logic receives multimedia bus access requests from one or more of said multimedia devices and grants multimedia bus access to one of said multimedia devices;

wherein said multimedia bus is an isochronous bus; and wherein said multimedia bus arbitration logic receives multimedia bus bandwidth requests from one or more of said multimedia devices and grants said requested amount of multimedia bus bandwidth to one of said one or more multimedia devices.

28. A computer system, comprising:

a CPU;

main memory which stores data accessible by the CPU;

bridge logic coupled to the CPU and to the main memory, wherein the bridge logic includes a memory controller coupled to the main memory and also includes expansion bus interface logic;

an expansion bus coupled to the bridge logic, wherein said expansion bus includes a plurality of data lines and control lines;

a multimedia bus, wherein said multimedia bus includes a plurality of data lines for transmitting data;

a multimedia memory coupled to said expansion bus and also coupled to said multimedia bus, wherein said multimedia memory stores multimedia data used for video and audio processing; and a plurality of multimedia devices coupled to said expansion bus and to said multimedia bus, wherein each of said multimedia devices include interface logic for accessing said multimedia bus and performing transfers on said multimedia bus, wherein one or more of said multimedia devices access said multimedia data in said multimedia memory; and wherein said bridge logic further comprises expansion bus arbitration logic coupled to said CPU and said expansion bus, wherein said expansion bus arbitration logic receives expansion bus access requests from one or more of said multimedia devices and grants expansion bus access to one of said one or more multimedia devices.

29. The computer system of claim 28, wherein said expansion bus arbitration logic is further coupled to said multimedia bus;

wherein said expansion bus arbitration logic further receives multimedia bus access requests from one or more of said multimedia devices and grants multimedia bus access to one of said one or more multimedia devices.

* * * * *